(12) United States Patent
Greasley

(10) Patent No.: US 6,809,729 B2
(45) Date of Patent: Oct. 26, 2004

(54) COMPUTER GRAPHICS

(75) Inventor: Jack Greasley, London (GB)

(73) Assignee: Clearspeed Technology Limited, Bristol (GB)

( * ) Notice: Subject to any disclaimer, the term of this patent is extended or adjusted under 35 U.S.C. 154(b) by 0 days.

(21) Appl. No.: 10/050,546

(22) Filed: Jan. 18, 2002

(65) Prior Publication Data

US 2002/0118190 A1 Aug. 29, 2002

(30) Foreign Application Priority Data

Jan. 19, 2001 (GB) .............................................. 0101412

(51) Int. Cl.$^7$ ............................................... G06T 15/50
(52) U.S. Cl. ...................................................... 345/426
(58) Field of Search ................................. 345/426, 418

(56) References Cited

U.S. PATENT DOCUMENTS

| | | | | | |
|---|---|---|---|---|---|
| 5,720,020 | A | * | 2/1998 | Tannenbaum et al. | 345/629 |
| 5,734,385 | A | * | 3/1998 | Mima | 345/426 |
| 5,854,632 | A | * | 12/1998 | Steiner | 345/426 |
| 6,226,005 | B1 | * | 5/2001 | Laferriere | 345/426 |
| 6,320,977 | B1 | * | 11/2001 | Tokura | 382/151 |

FOREIGN PATENT DOCUMENTS

| | | |
|---|---|---|
| EP | 0856815 A2 | 8/1998 |

OTHER PUBLICATIONS

"Open GL–rendering of Underwater Caustics", available on the internet on Feb. 5, 2000 at URL http://toolbox.sgi.com/TasteOfDT/documents/OpenGL/tips/caustics/; 5 pages.

Bostock et al.: "Ray Tracing Caustics using Illumination Maps", Jan. 11, 2000, available on the internet at URL http://mbostock.student.princeton.edu/cos426/final/.

Blinn et al., "Texture and Reflection in Computer Generated Images", Communications of the ACM, Oct. 1976, vol. 19, No. 10, pp. 542–547.

Phong, Bui Tuong, "Illumination for Computer Generated Pictures", Copyright 1975 by Association for Computing Machinery, Inc., 13 pages.

Gouraud Henri, "Continuous Shading of Curved Surfaces", manuscript received Aug. 19, 1970, 12 pages.

Jensen, Henrik Wann, "Rendering Caustics on Non–Lambertian Surfaces", Department of Graphical Communication, Technical University of Denmark, Proceedings of Graphics Interface '96, 3 pages.

Collins, Steven, "Adaptive Splatting for Specular to Diffuse Light Transport", in proceedings of 5.Eurographics Workshop on Rendering, Darmstadt 1994, 15 pages.

Jensen, Henrik Wann et al., "Efficient Simulation of Light Transport in Scenes with Participating Media using Photon Maps", Computer Graphics Proceedings, Annual Conference Series, Orlando, Florida, Jul. 19–24, 1998, pp. 311–320.

* cited by examiner

*Primary Examiner*—Don Wong
*Assistant Examiner*—Huedung X. Cao
(74) *Attorney, Agent, or Firm*—Potomac Patent Group PLLC

(57) ABSTRACT

A method for producing an image of a scene including a refractive object includes generating an illumination map, representing the scene. The method creates a first bitmap for the refractive object, the bitmap comprising a plurality of pixels; each of said pixels in the first bitmap is mapped to a pixel in a second bitmap, the mapping representing the effect of refraction on light passing through the object; and the effects of the light illuminating the pixels in the first bitmap are added into said second bitmap.

15 Claims, 4 Drawing Sheets

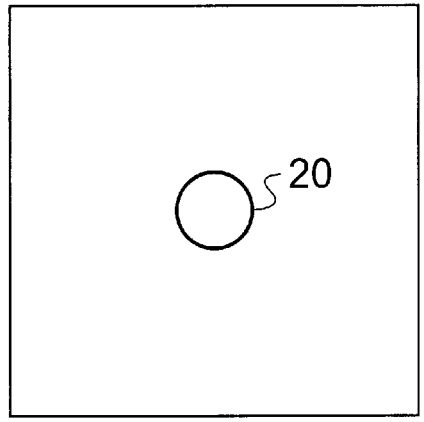
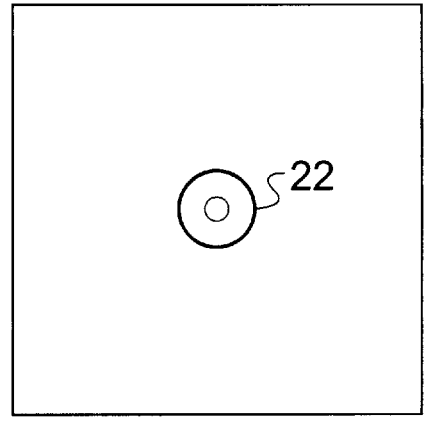
Fig. 2a
Fig. 2b
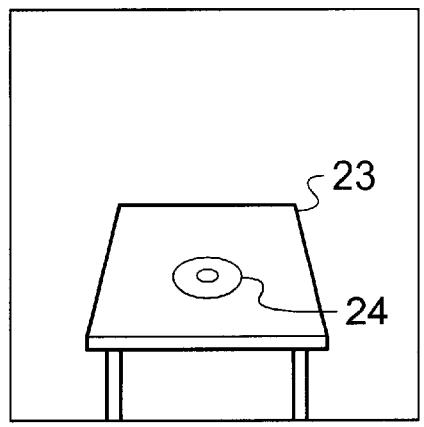
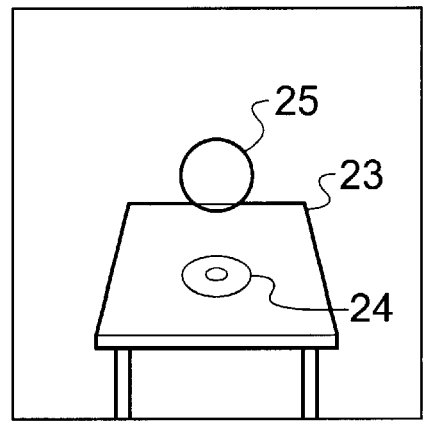
Fig. 2c
Fig. 2d

COMPUTER GRAPHICS

This application claims priority under 35 U.S.C. §§119 and/or 365 to 0101412.5 filed in the United Kingdom on Jan. 19, 2001; the entire content of which is hereby incorporated by reference.

This invention relates to a computer graphics system, and in particular to a system allowing representation of the effects of illumination through transparent, refractive bodies.

As is well known, when light passes through a solid transparent body, it is refracted. That is, rays of light are bent at the intersection between two materials having different refractive indices. When such a body is curved, or has a thickness which varies over its surface, this can have the result that light rays are focussed onto some parts of a surface, which is being illuminated through the solid body, rather than onto other areas.

Thus, the bottom of a pool of water, or the surface on which a wine glass is standing, include some regions which are lit very much more than other regions. These patterns are called caustic patterns.

The present invention relates to a method for rendering these caustic patterns in a computer graphics system, in particular in a system which produces real-time images.

In the field of computer graphics, several different types of image generation technique are known. For example, images can be generated by a technique known as ray-tracing, in which the paths of light rays are traced from a projection plane into a scene. Thus, an image of the scene is formed on the projection plane. Another example is the technique of particle-tracing, in which the paths of light particles are traced, as they are emitted from a light source until they intercept a viewing plane.

However, the techniques of ray-tracing and particle-tracing cannot generally be used to produce real-time images, as each scene typically takes many minutes or hours, if not days in the case of particle-tracing, to produce an image.

A further alternative technique, which can more easily be used to produce images in real-time, is scan-line rendering. Scan-line rendering involves mathematically projecting the objects in a scene onto a projection plane. A shading algorithm is then used to colour the objects.

Conventional scan-line rendering techniques and shading algorithms do not take into account the effects of refraction of light through transparent media. As a result, such techniques fail to reproduce caustics patterns which are generated.

A document "Open GL-rendering of Underwater Caustics", available on the internet on Feb. 5, 2000, at the URL http://toolbox.sgi.com/TasteofDT/documents/OpenGL/tips/caustics/, describes a technique for simulating such effects. Specifically, a pre-calculated illumination map is applied to the surface, in the same way that surface textures can be applied to objects.

However, this technique produces repetitive patterns and, since it is not linked to any actual geometry in the scene, is inherently unrealistic.

According to a first aspect of the present invention, there is provided a method for producing an image of a scene including a refractive object.

More specifically, according to the first aspect of the invention, there is provided a method of generating an illumination map, representing a scene including a refractive object, the method comprising:

for one or more light source, creating a first bitmap for the refractive object, the bitmap comprising a plurality of pixels;

for each of said pixels in the first bitmap, mapping said pixel to a pixel in a second bitmap, the mapping representing the effect of refraction on light passing through the object; and adding the effects of the light illuminating the pixels in the first bitmap into said second bitmap.

For a better understanding of the present invention, and to show how it may be put into effect, reference will now be made, by way of example, to the accompanying drawings, in which:

FIG. 2 shows various stages in a method in accordance with the present invention.

Figure 1:
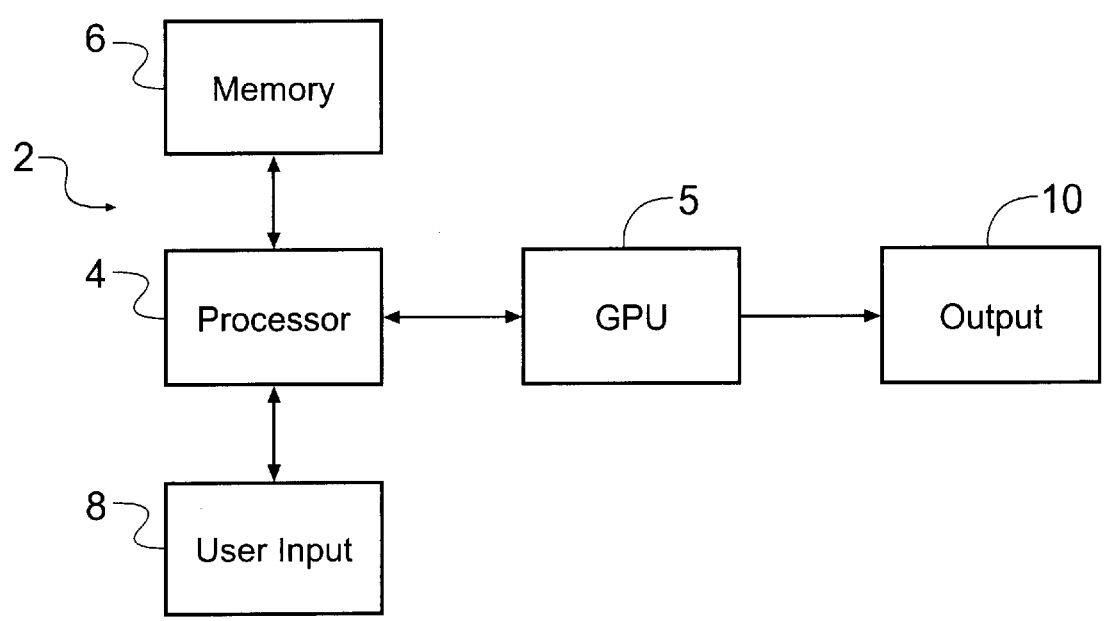
FIG. 1 is a block schematic diagram of the relevant components of a computer system in accordance with one aspect of the invention.

FIG. 1 shows the important components of a computer system, which can be used in graphics processing. Thus, the computer system 2 has a processor 4, which operates in conjunction with a Graphics Processing Unit (GPU) 5, that is, a high specification processor, which is optimised for graphics use. The processor 4 and GPU 5 operate in conjunction with a memory 6, which for example stores images created by the GPU 5.

The system 2 also includes user input devices 8, which allow the user to input image data, parameter values etc, to be used by the GPU 5. For examples the input devices 8 can include a disk drive, to read data stored on a physical storage medium, a modem, to receive data from a remote device, a keyboard, and/or a mouse, to allow the user to input or select data or parameter values, amongst other things. Further, the system 2 also includes output devices 10, for providing the calculated images to a user. For example, the output devices 10 can include a disk drive, to store data onto a physical storage medium, a modem, to transfer calculated data to a remote device, or a monitor screen, for displaying a calculated image. It will be appreciated that the computer shown in FIG. 1 is generally conventional, the invention residing, in the preferred embodiment, in the software which is run on the GPU 5.

In particular, the illustrated embodiment of the present invention relates to a technique for simulating the effects of refraction, in generating caustic patterns, in a computer-generated image.

As previously mentioned, the document "Open GL-rendering of Underwater Caustics" describes the use of pre-calculated lighting maps, but these do not produce realistic lighting effects. The present invention relates to the use of a lighting map which can be calculated in real time, taking into account the actual geometry of the scene, thereby improving the realism which can be achieved.

More specifically, in accordance with the invention, the effects of refraction can be simulated using a real time rendering system.

In conventional scan-line rendering systems, an object can for example be rendered using a technique known as Phong shading. This involves calculating a colour value for each pixel within a surface, using a surface, normal, obtained by interpolating across the surface of the object, the material properties, and the position of the light source.

In the method according to the preferred embodiment of the invention, the whole scene, with the exception of the refractive object, is first rendered into a bitmap, for example using scan line rendering with Phong shading, as described above. This bitmap is then defined as a texture map, which can be applied to the image.

The effect of the refractive object is then superimposed on this. The effect of refraction is calculated using an illumination map, as described below.

This process is shown in FIG. 2, with reference to a scene in which a refractive body (namely a sphere) is positioned above a solid body (namely a table). FIG. 2a shows the geometry of the refractive sphere 20. FIG. 2b shows a caustic illumination map 22 created for the sphere, in a manner to be described in more detail below. As shown in FIG. 2c, the method then involves rendering the scene, according to its inherent geometry (including a table 23 and the caustic pattern 24 created on the table 23 by the refractive sphere), using the illumination map. However, in this step, the refractive object itself is not rendered. As shown in FIG. 2d, the refractive sphere is rendered into the scene as a final step.

Figure 3:
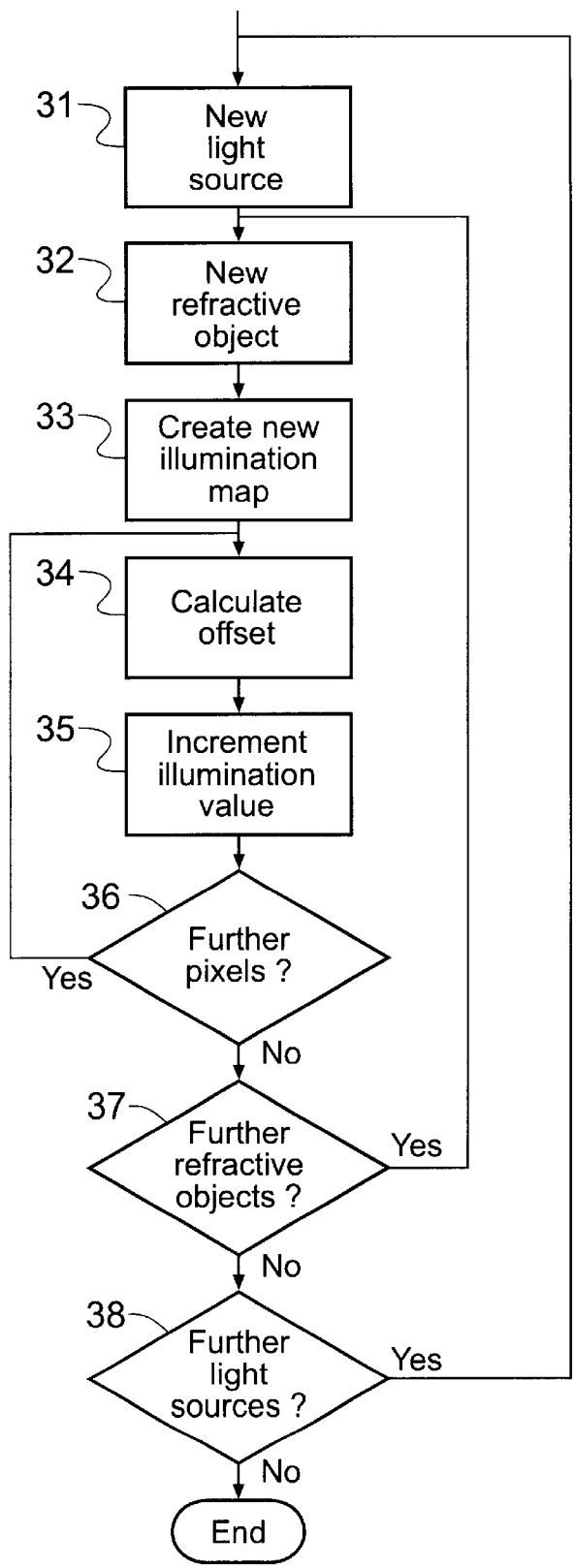
FIG. 3 is a flow chart illustrating a method in accordance with an aspect of the invention.

FIG. 3 is a flow chart which illustrates the creation of the illumination map.

In step 31, the process is started. If there is more than one light source in a scene, the effect of each is calculated separately, and step 31 begins by considering a new light source. In effect, to create a caustic image, we need to render the scene from the point of view of each light source. Light sources which are considered may be either direct or reflected, for example.

Similarly, if there is more than one refractive object in the scene, they are treated separately, and step 32 considers a new object. In step 33, a new illumination bitmap is defined, corresponding to the surface of the new object considered in step 32.

Each pixel in the illumination bitmap defined in step 33 is considered separately, and in step 34 a new pixel is considered.

Specifically, the surface normal is obtained for each pixel as it is considered, using a technique similar to Phong shading, as described above. This normal is used in step 34 in a calculation, which is based on standard optical laws, using a value for the refractive index of the refractive body, to calculate an offset value. Specifically, this calculates the amount by which light travelling from the scene, through the object, is bent due to refraction.

Figure 4:
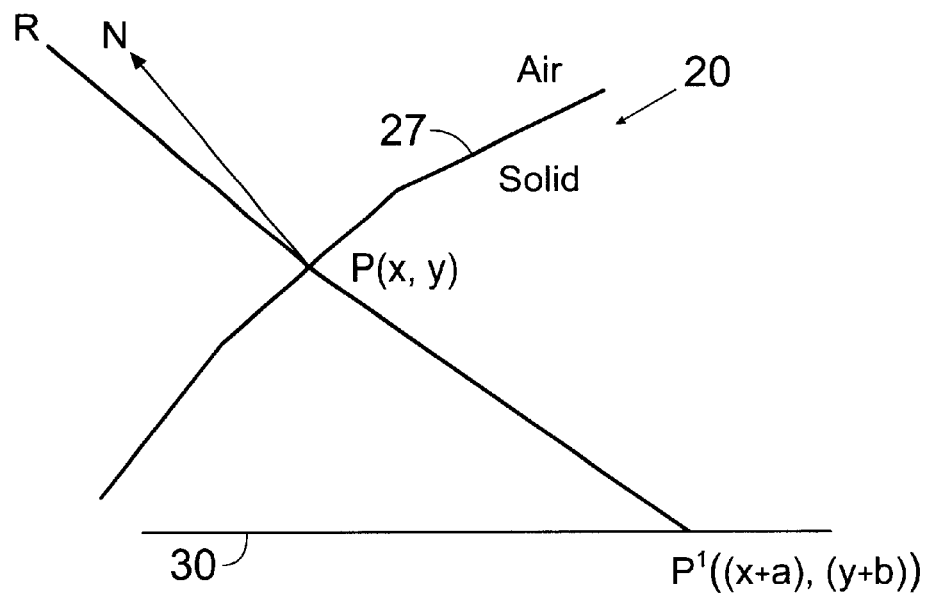
FIG. 4 is a schematic illustration of a step in the method of FIG. 3.

FIG. 4 is a cross-sectional view of a polygonal hull of a refractive object 20 in a scene being rendered, in order to illustrate this calculation. An incident light ray at a pixel P(x,y) at a surface 27, defining an interface between the air and the solid body, is bent in accordance with the laws of optics by an amount dependent on the refractive material of the body and the angle of incidence between the incident light ray and the interpolated surface normal N. As a result of refraction, the ray illuminates a pixel $P^1((x+a),(y+b))$ on an illuminated surface 30, and the offset values a,b can be calculated.

In the illustrated embodiment of the invention, the offset values a,b are calculated on the assumption that all points on the surface of the body 22 are at unit distance from the surface 30 which is being illuminated. This simplifying assumption means that the caustic patterns which are generated are not strictly accurate, in this embodiment of the invention, although they still have a convincing degree of reality. To improve the strict accuracy of the rendering, the equations can take into account the distance of the surface of the body 22 from the surface 30 which is being illuminated. However, this would have the effect of greatly slowing the required calculations, without perceptibly improving the image quality.

Using the offset calculated in step 34, the pixel P(x,y) under consideration is mapped in step 35 to a pixel $P^1((x+a),(y+b))$ in the illumination bitmap which was defined in step 33, and a small amount is incremented to the colour value of the pixel in the illumination bitmap, which therefore acts as a reference counter during this process.

It is then determined in step 36 whether there are further pixels of the illumination map to consider. If so, steps 34 and 35 are repeated. It not, the process passes to step 37, in which it is determined whether there are further refractive objects in the scene which need to be considered. If so, steps 32–37 are repeated. If not, the process passes to step 38, in which it is determined whether there are further light sources in the scene which need to be considered. If so, steps 31–38 are repeated. If not, the process ends.

The pseudo-code for the process of FIG. 3 is outlined below:

For Each Light Source
    For Each Refractive object
        Create a new illumination bitmap
           For each rasterised pixel
           Calculate refraction offset
           Map pixel into illumination bitmap
           Increment illumination bitmap pixel value
           End for
    End for
End for This has a direct analogy with the way light interacts with a real refractive body. Each pixel considered in the process of FIG. 3 can be thought of as representing a single incident photon having a discrete quantum of energy. The refractive body receives a uniform amount of energy across its surface. The refractive effect of the object can then focus this energy. This produces areas with higher incident energy, which, in the case of light energy, then have bright caustic highlights. Similarly, in this invention, by calculating the offsets of many pixels, the image of a cast caustic will be built up in the illumination bitmap.

This illumination bitmap can then be applied to objects in the scene as either a texture map or a projective texture, generally as described in the prior art document "Open GL-rendering of Underwater Caustics", referenced above. The technique of texture mapping is also described in "Texture and Reflection in Computer Generated Images", Blinn, et al, Communications of the ACM, October 1976, Volume 19 Number 10, pages 542–547.

Conventional uses of texture mapping typically involve the use a precalculated and prestored texture map. However, in this case the process starts with a blank (that is, all black, or all transparent) bitmap.

In normal texture mapping, various pixels are read from the texture map as the image is sampled, and each pixel in a given image may be read various times.

In the illustrated technique according to the invention, each pixel is written with some small incremental value (0.1,0.1,0.1) each time it would normally be read in texture mapping.

Thus, as the whole object is drawn, and each pixel is referenced multiple times, an image is formed in the previously blank image. If this process is combined with a dynamic texture co-ordinate generation scheme simulating refraction, a caustic illumination pattern will be built up.

This newly created illumination map can then be used in the same way as a normal texture map for other objects in the scene, thus simulating a caustic-illumination pattern being "cast" into the scene.

It will be apparent that, particularly where the refractive body is curved, or of variable thickness, the equation used in steps 35 and 36 is a many-to-one mapping, in that many of the pixels being evaluated may point to the same pixel in the illumination bitmap. Thus, many of the light rays incident on different points on the surface of the refractive object are mapped to the same point on the illuminated surface, corresponding to the way in which incident light can be focussed by a curved or variable thickness refractive body to generate caustic highlights.

Since this algorithm provides a many-to-one mapping, it cannot be ensured that every pixel in the illumination bitmap is referenced by any pixel in the original scene. In that case, holes can appear in the rendered image. If the resultant improvement in image quality is thought to be justified by the additional computational cost, techniques are available for removing these holes by distributing the energy in the illumination bitmap more evenly, For example, the holes can be removed by splatting of illumination map pixels, or by a post-rasterization application of a Gaussian kernel filter. More details of these techniques are available in the documents "Adaptive Splatting for Specular to Diffuse Light Transport", Collins, available on the internet at the URL http://vangogh.cs.tcd.ie/scollins/scollins.html and "Ray Tracing using Illumination Maps", Bostock et al, dated Jan. 11, 2000, and available on the internet at the URL http://nbostock.student.princeton.edu/cos426/final/.

The illustrated embodiment of the invention treats each light source as a single source of white light. However, the reality is slightly more complex, and a preferred embodiment of the invention takes account of a phenomenon known as Achromatic aberration. This involves the separation of white light into its component wavelengths as is it refracted through a transparent medium, since different wavelengths travel at different speeds through a refractive medium, and are refracted by different amounts. This means that red light is refracted less than blue light, thus causing bands of different colours to appear. This effect is most obvious in the generation of rainbows as light passes through a prism of glass.

Figure 5:
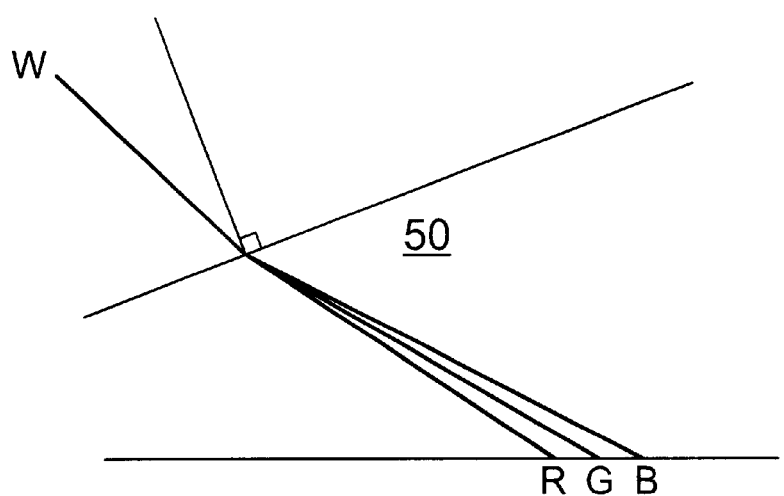
FIG. 5 is a schematic illustration of the phenomenon of chromatic aberration.

This process is illustrated in FIG. 5, which shows red (R), green (G) and blue (B) components of an incident white (W) light ray light being refracted by different amounts by a surface of a refractive body 50.

In accordance with the invention, chromatic aberration can be simulated with a small adjustment.

Specifically, having calculated an offset value as described above (step 34 in FIG. 3), the illumination value can incremented in respect of one colour, for example red. Then, slightly different offset values are calculated for green and blue light, taking account of the differential refraction, and the illumination values for corresponding pixels can be incremented. The resulting illumination bitmaps will then typically have bands of colour, thereby simulating chromatic aberration.

There is therefore obtained a method which allows the real time generation of caustic images.

What is claimed is:

1. A method of generating an illumination map, representing a scene including at least one refractive object, the method comprising:

for one or more light source, creating a first bitmap for the refractive object, the bitmap comprising a plurality of pixels;

for each of said pixels in the first bitmap, mapping said pixel to a pixel in a second bitmap, the mapping representing the effect of refraction of light passing through the object; and adding the effects of the mappings in said second bitmap to represent the effect of the refractive object.

2. A method as claimed in claim 1, wherein the mapping from the first bitmap to the second bitmap assumes a constant distance from a surface of the refractive object to an illuminated surface.

3. A method as claimed in claim 1, comprising mapping each of said pixels in the first bitmap to respective pixels in the second bitmap multiple times, the mappings representing the effect of refraction on different wavelengths of light.

4. A method as claimed in claim 3, comprising mapping each of said pixels in the first bitmap to respective pixels in the second bitmap three times, the three mappings representing the effect of refraction on red, green and blue light.

5. A computer system, adapted for operation in accordance with claim 1.

6. A computer software product, comprising code for performing a method as defined in claim 1.

7. A method of rendering a texture map for a scene which includes at least one refractive object and at least one light source, the method comprising:

(a) creating an empty texture map;

(b) rendering the refractive object from the point of view of the light source; and (c) for each visible pixel of the refractive object:

(1) calculating a refraction offset based on a surface normal for the pixel concerned;

(2) using the refraction offset, mapping the pixel to the texture map; and (3) incrementing a value in the texture map corresponding to the pixel concerned.

8. A method as claimed in claim 7, wherein steps (a), (b) and (c)(1) through (c)(3) are repeated for each light source in the scene.

9. A method as claimed in claim 7, wherein steps (a), (b) and (c)(1) through (c)(3) are repeated for each refractive object in the scene.

10. A method as claimed in claim 7, wherein calculating the refraction offset assumes a constant distance to the surface.

11. A method as claimed in claim 10, wherein steps (a), (b) and (c)(1) through (c)(3) are repeated for each light source in the scene.

12. A method as claimed in claim 10, wherein steps (a), (b) and (c)(1) through (c)(3) are repeated for each refractive object in the scene.

13. A method as claimed in claim 7, comprising mapping each of said pixels in the refractive object to respective pixels in the texture map three times, the three mappings representing the effect of refraction on red, green and blue light.

14. A method as claimed in claim 13, wherein steps (a), (b) and (c)(1) through (c)(3) are repeated for each light source in the scene.

15. A method as claimed in claim 13, wherein steps (a), (b) and (c)(1) through (c)(3) are repeated for each refractive object in the scene.

* * * * *